United States Patent
Takahashi

(10) Patent No.: US 9,582,758 B2
(45) Date of Patent: Feb. 28, 2017

(54) DATA CLASSIFICATION METHOD, STORAGE MEDIUM, AND CLASSIFICATION DEVICE

(71) Applicant: FUJITSU LIMITED, Kawasaki-shi, Kanagawa (JP)

(72) Inventor: Tetsuro Takahashi, Brookline, MA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/791,651

(22) Filed: Jul. 6, 2015

(65) Prior Publication Data

US 2016/0012333 A1    Jan. 14, 2016

(30) Foreign Application Priority Data

Jul. 8, 2014    (JP) ................................ 2014-140254

(51) Int. Cl.
*G06F 15/18*    (2006.01)
*G06N 5/02*    (2006.01)
*G06N 99/00*    (2010.01)

(52) U.S. Cl.
CPC ............. *G06N 5/02* (2013.01); *G06N 99/005* (2013.01)

(58) Field of Classification Search
USPC .......................................................... 706/12
See application file for complete search history.

(56) References Cited

U.S. PATENT DOCUMENTS

| | | | | |
|---|---|---|---|---|
| 7,599,926 B2* | 10/2009 | Takahashi | ........... | G06F 17/3061 |
| 8,244,773 B2* | 8/2012 | Uchino | ............. | G06F 17/30864 |
| | | | | 707/797 |
| 8,316,026 B2* | 11/2012 | Uchino | ............. | G06F 17/30864 |
| | | | | 707/737 |
| 2005/0102246 A1 | 5/2005 | Movellan et al. | | |
| 2010/0070339 A1* | 3/2010 | Bae | ........................ | G06Q 30/02 |
| | | | | 705/7.11 |

FOREIGN PATENT DOCUMENTS

JP    2005-44330    2/2005

OTHER PUBLICATIONS

A fuzzy based classification scheme for unconstrained handwritten Devanagari character recognition Sushama Shelke; Shaila Apte 2015 International Conference on Communication, Information & Computing Technology (ICCICT) Year: 2015 pp. 1-6, DOI: 10.1109/ICCICT.2015.7045738 IEEE Conference Publications.*

(Continued)

*Primary Examiner* — Michael B Holmes
(74) *Attorney, Agent, or Firm* — Fujitsu Patent Center

(57) ABSTRACT

A data classification method which classifies a plurality of data into a plurality of classification items based on a feature quantity included in the data, the method includes calculating, by a processor, an appearance probabilities in which training data including the feature quantity appears in the classification items in a distribution of the data, generating, by the processor, a rule having the feature quantity and a weighting of the feature quantity based on a plurality of the training data having the feature quantity based on the appearance probabilities; and classifying, by the processor, the plurality of data according to the rule.

17 Claims, 12 Drawing Sheets

(56) References Cited

OTHER PUBLICATIONS

Detection of obsessive compulsive disorder using resting-state functional connectivity data Sona Khaneh Shenas; Ugur Halici; Metehan Cicek 2013 6th International Conference on Biomedical Engineering and Informatics Year: 2013 pp. 132-136, DOI: 10.1109/BMEI.2013.6746921 IEEE Conference Publications.*

A Two Level Algorithm for Text Detection in Natural Scene Images Li Rong; Wang Suyu; Zhixin Shi 2014 11th IAPR International Workshop on Document Analysis Systems Year: 2014 pp. 329-333, DOI: 10.1109/DAS.2014.41 IEEE Conference Publications.*

Learning Graphical Models for Hypothesis Testing and Classification Vincent Y. F. Tan; Sujay Sanghavi; John W. Fisher; Alan S. Willsky IEEE Transactions on Signal Processing Year: 2010, vol. 58, Issue: 11 pp. 5481-5495, DOI: 10.1109/TSP.2010.2059019 IEEE Journals & Magazines.*

* cited by examiner

| LABEL | FEATURE QUANTITY (WORD) | | | |
|---|---|---|---|---|
| | BARGAIN | POSTAGE | LUCK WITH MONEY | WATER | ... |
| +1 | 1 | 4 | 1 | 0 | .. |
| -1 | 0 | 3 | 0 | 0 | .. |
| -1 | 0 | 0 | 0 | ③ | .. |
| +1 | 2 | 0 | 0 | ② | .. |
| +1 | 0 | 0 | 0 | 0 | .. |
| -1 | 3 | 1 | 2 | 0 | .. |
| +1 | 1 | 2 | 0 | 0 | .. |
| .. | .. | .. | .. | .. | .. | p3, p4

DATA CLASSIFICATION METHOD, STORAGE MEDIUM, AND CLASSIFICATION DEVICE

CROSS-REFERENCE TO RELATED APPLICATION

This application is based upon and claims the benefit of priority of the prior Japanese Patent Application No. 2014-140254, filed on Jul. 8, 2014, the entire contents of which are incorporated herein by reference.

FIELD

The embodiment discussed herein is related to a data classification method, a non-transitory computer readable storage medium, and a classification device.

BACKGROUND

A technique, which classifies data by a machine learning based on training data, is proposed (for example, patent document 1). The machine learning based on the training data is used for the classifications of the data such as image or document widely. When the plurality of data is classified in one of the plurality of items, a learning device generates a rule (model) indicating feature quantity and its weighting for classification based on the training data. And a classifier calculates score based on the weighting of the feature quantity included in the data as input by the plurality of data and classifies the data in the plurality of items based on the score.

CITATION

Patent Document

[patent document 1] Japanese Laid-Open Patent Publication No. 2005-44330.

SUMMARY

In this way, according to the machine learning, the model for classifications is learned as data of the correct answer by the training data. However, the distribution that the training data have may be different from distribution (described as true distribution) that data targeted for the classification have. When the distribution that the training data have is different from the true distribution, the classification precision of data may decrease.

According to a first aspect of the embodiment, a data classification method which classifies a plurality of data into a plurality of classification items based on a feature quantity included in the data, the method includes calculating, by a processor, an appearance probabilities in which training data including the feature quantity appears in the classification items in a distribution of the data, generating, by the processor, a rule having the feature quantity and a weighting of the feature quantity based on a plurality of the training data having the feature quantity based on the appearance probabilities; and classifying, by the processor, the plurality of data according to the rule.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a diagram indicating another example of the training data Td by a table H3.

DESCRIPTION OF EMBODIMENTS

Process of the Classification of Data

Figure 1:
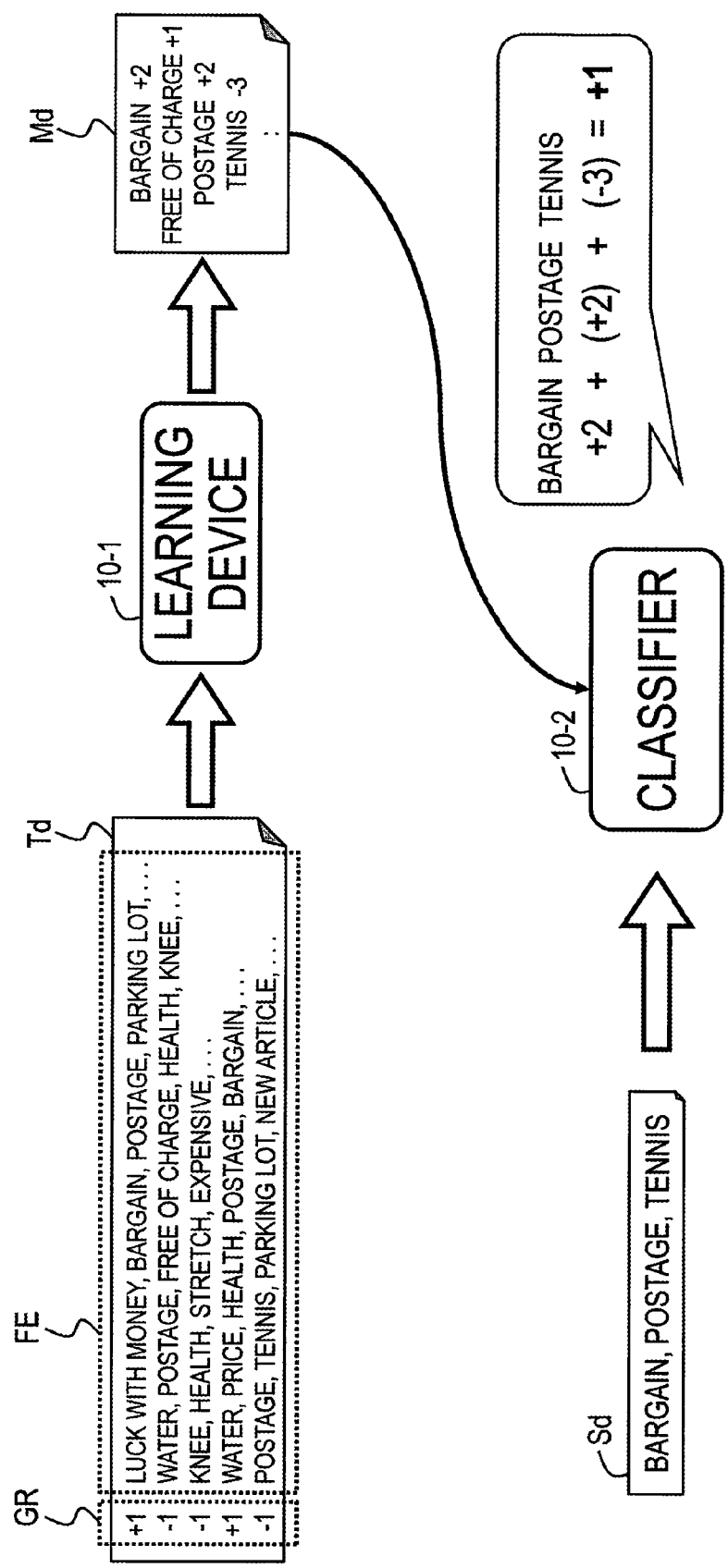
FIG. 1 is a diagram explaining a summary of the classification process of data according to an embodiment.

FIG. 1 is a diagram explaining a summary of the classification process of data according to an embodiment. The processes of the classification using the machine learning are classified into two phases of the learning and the classification. In the learning phase, a learning device 10-1 is inputted data Td (described as training data) given an item (called as a classification item as follows) which would like to classify beforehand, and outputs a model "Md". For example, the model Md (rule) is constituted by the feature quantity and the weighting of the feature quantity. The training data Td is data to generate the model Md.

For example, when data targeted for the classification are the documents such as e (electronic)-mails, the classification item is a spam article and a non-spam article. In addition, the feature quantity is a word included in the documents. The spam article is, for example, an unwanted e-mail and is an e-mail sent without the agreement of the user.

For example, five example data FE are exemplified in FIG. 1 as training data Td. In a block of the training data Td in FIG. 1, each line of the training data Td corresponds with one example data FE. In addition, a label "+1/−1" GR which is given a head of each line represents classification item of "+1: spam article/−1: non-spam article" which is detected beforehand. For example, a user determines whether the example data FE is a spam article or a non-spam article and labels classification item of "+1: spam article/−1: non-spam article" in each example data FE, beforehand. In an example depicted by FIG. 1, first line example data FE is a spam article (+1) including the feature quantity of "Luck with money, bargain, postage, a parking . . . " and a second line example data FE is a non-spam article (−1) including the feature quantity of "water, postage, free of charge, healthy, a knee . . . ".

The learning device 10-1 generates the model Md as input by the training data Td depicted by FIG. 1. A generation process of the model Md will be described later according to a flow chart of FIG. 2. The model Md, of which the learning device 10-1 generates, has a weighting in every word that the training data Td includes. For example, the model Md depicted by FIG. 1 has the feature quantity "bargain" and its weight "+2". Similarly, the model Md has the feature quantity "free of charge" and its weighting "+1", the feature quantity "postage" and its weighting "+2" and the feature quantity "tennis" and its weighting "−3". In the example of FIG. 1, the feature quantity "bargain" and "postage" which have a large weighting indicates the feature quantity that the contribution ratio to the spam article is high in. In addition, the feature quantity "tennis" which has a small weighting indicates the feature quantity that the contribution ratio to the non-spam article is high in.

Then, in the classification phase, the classifier 10-2 is inputted data Sd for the classification target, and outputs the classification result to the classification item of the data Sd for the classification target. The data Sd for the classification target is the data that the classification whether the spam article or the non-spam article is not identified, unlike the training data Td.

For example, the classifier 10-2 calculates score corresponding to the feature quantity included in the data Sd for the classification target, based on the model Md. And the classifier 10-2 classifies the data, of which the score that is calculated has a larger than "0", for example, in the spam article, and classifies the data, of which the score that is calculated has a less than "0", in the non-spam article.

In an example of FIG. 1, the classifier 10-2, when the data Sd for the classification target includes the feature quantity of "bargain, postage, tennis", for example, acquires the weightings of each feature quantity (that is, "bargain: +2", "postage +2", "tennis −3") based on the model Md. And the classifier 10-2 calculates the score "+1" (=+2+2+(−3)) based on calculating formula "+2 [bargain]+2 [postage]+(−3) [tennis]". In this case, the classifier 10-2 determines that the data Sd for the classification target is a spam article, because the score "+1" is bigger than "0".

In addition, in this example, it is exemplified that the data for the classification target are documents and data is classified in a spam article and a non-spam article. However, the embodiment is not limited to this example. For example, the machine learning based on training data Td is applied to a case that the data for the classification are image data and when is classified whether the image data includes a face. In this time, the feature quantity is, for example, a ratio of flesh color, color information of the pixel, existence or non-existence of line in the face.

(Flow Chart)

Figure 2:
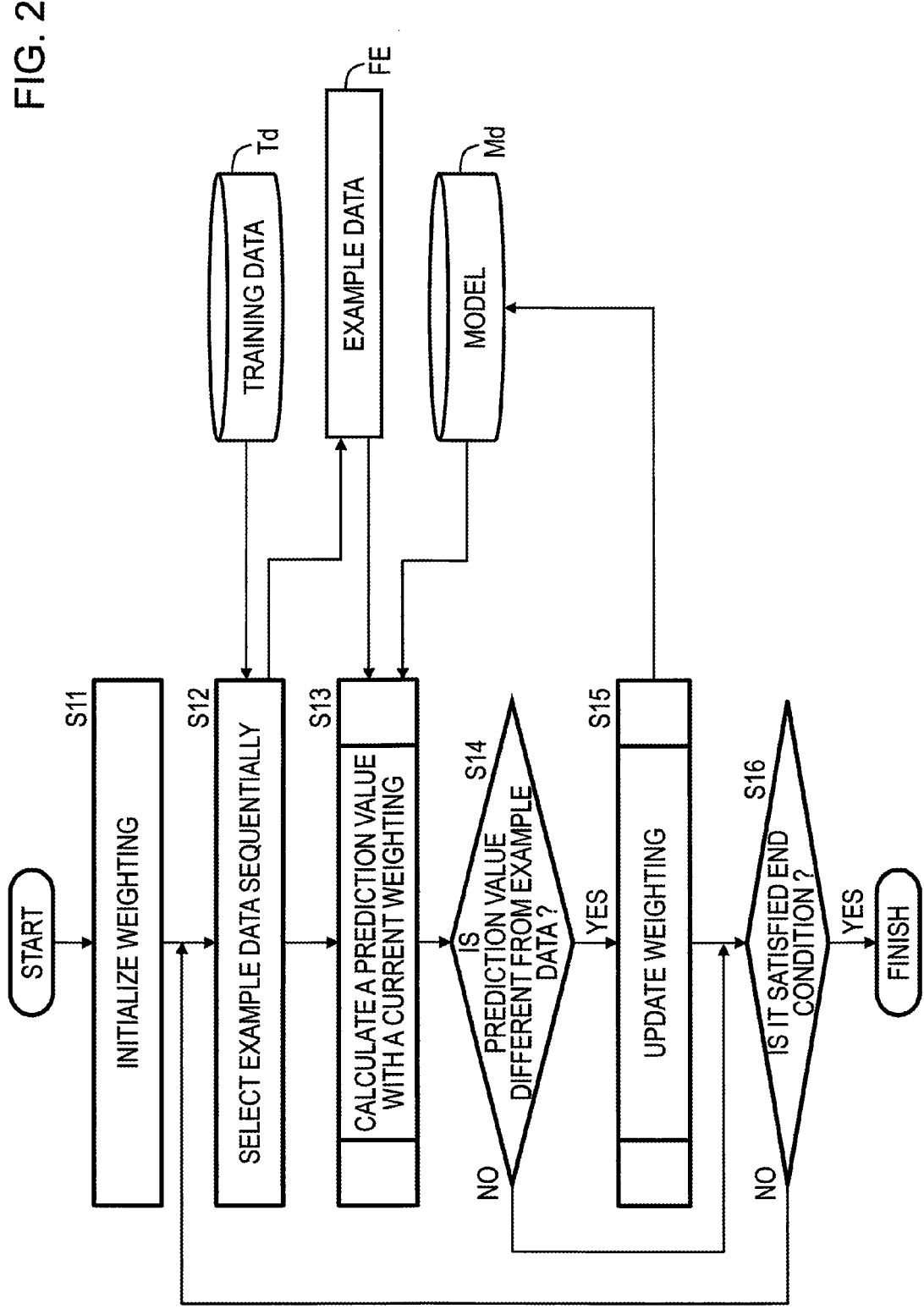
FIG. 2 is a diagram explaining a flow of the generation process of the model Md in the learning device 10-1.

FIG. 2 is a diagram explaining a flow of the generation process of the model Md in the learning device 10-1. Firstly, the learning device 10-1 initializes the weighting of each word which is feature quantity (S11). Next, the learning device 10-1 selects example data FE of which the training data Td has sequentially (S12). And the learning device 10-1 calculates predicted value AN of the classification item GR based on current weighting about the example data FE which is selected (S13). The predicted value AN indicates to a forecast result whether the example data FE, which is selected and classified based on current weighting, is a spam article, or is a non-spam article. The details of the process of the step S13 will be described later based on a flow chart in FIG. 3.

Then, the learning device 10-1 determines whether the predicted value AN is different from the classification item GR set beforehand in the example data FE which is selected (S14). Because the weighting (model) Md of each feature quantity included in the example data FE is not appropriate when the predicted value AN is different from the classification item GR (YES/S14), the learning device 10-1 updates the weighting (S15). The details of the process in the step S15 will be described later based on a flow chart in FIG. 4. On the other hand, because the weighting of each feature quantity included in the example data FE is appropriate when the predicted value AN of the classification item GR which is calculated matches with the classification item GR set beforehand in the example data FE which is selected (NO of S14), the learning device 10-1 does not update the weighting.

And the learning device 10-1 determines whether a predetermined end condition is satisfied (S16). The end condition is a case when a precision, of which the predicted value AN of the classification item GR matches with the classification item GR which is set beforehand in the example data FE, gradually rises and the change of the precision converged. In other words, the learning device 10-1 finishes generation processing of the weighting based on the training data Td, when a matching precision of the predicted value AN in the classification item GR reaches a predetermined standard. Thereby, it is possible that the learning device 10-1 generates the weighting with a high precision.

Or, the end condition may be the number of the example data FE which are input. When the number of the example data FE which are input reaches a predetermined number, the learning device 10-1 finishes the generation process of the weighting. Accordingly, the learning device 10-1 may input the training data Td only one time and may generate the model Md, In addition, the learning device 10-1 may repeatedly input the training data Td several times and may generate the model Md. For example, the learning device 10-1 repeatedly inputs the training data Td several times and generates the model Md, it is possible that the learning device 10-1 raises the precision of the model Md. Thereby, it is possible that the learning device 10-1 generates the weighting based on the training data Td with a more highly precise, even when the number of the example data FE is few.

When the end condition is not satisfied (NO of S16), the learning device 10-1 selects next example data FE (S12) and repeats the process in the steps S13-S15. When the end condition is satisfied (YES of S16), the learning device 10-1 finishes the processing.

Figure 3:
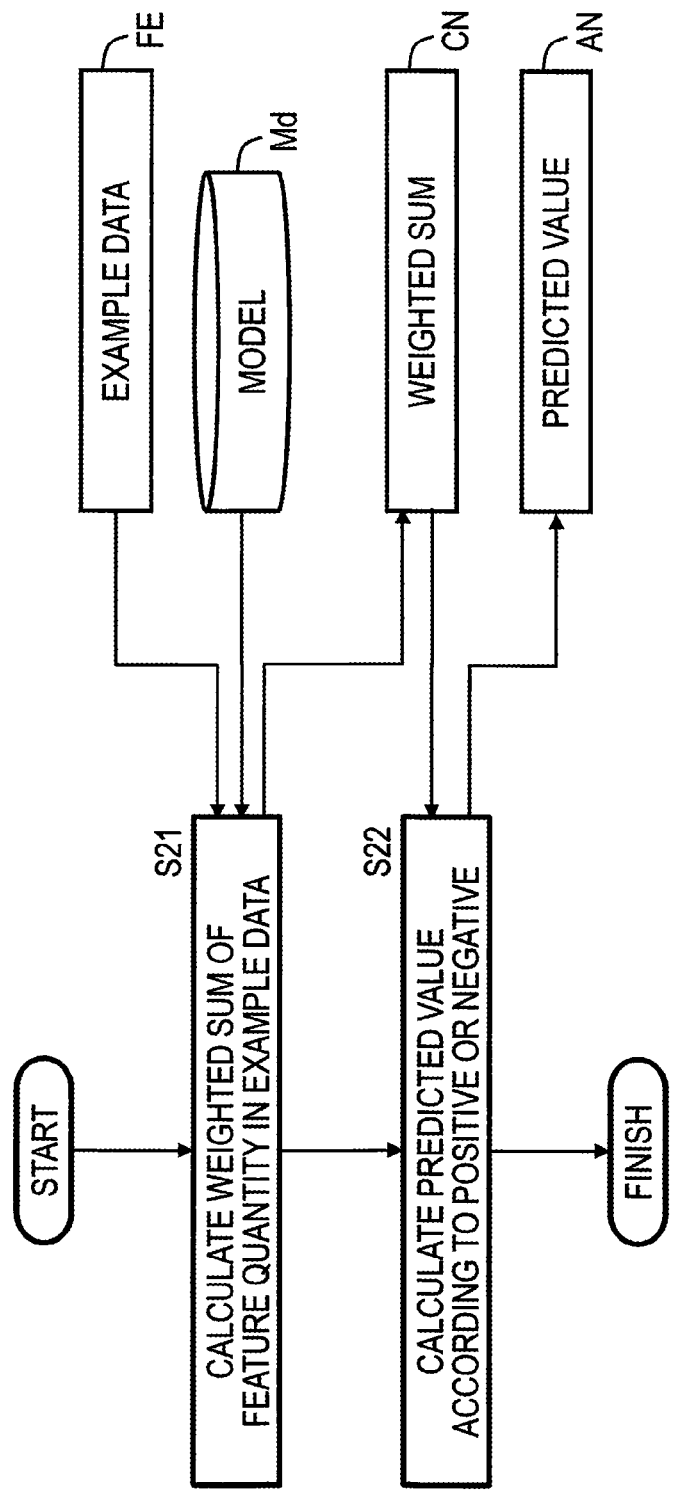
FIG. 3 is a diagram of flow chart explaining processes in the step S13 in the flow chart of FIG. 2.

FIG. 3 is a diagram of flow chart explaining processes in the step S13 in the flow chart of FIG. 2. The step S13 indicates to a process of calculating a predicted value AN of the classification item GR based on current weighting which is stored in the model Md about the example data FE which is selected. The learning device 10 calculates a weighted sum CN of the feature quantity which is included in the example data FE which is selected (S21). And the learning device 10-1 outputs the predicted value AN based on whether the weighted sum CN which is calculated is more than "0" (S22).

An example represents a case that the example data FE is a non-spam article and is included that the word "bargain"

is single, the word "water" is single and the word "free shipping" is two as the feature quantity. In addition, the current weightings stored by the model Md are that the weighting of the feature quantity "luck with money" is "+2", the weighting of the feature quantity "bargain" is "+1", the weighting of the feature quantity "water" is "−1", the weighting of the feature quantity "free shipping" is "+1" and the weighting of the feature quantity "parking lot" is "+1". Therefore, the learning device 10-1 calculates the weighted sum CN "2" based on the calculating formula (1*(+1) [bargain]+1*(−1) [water]+2*(+1) [free shipping]). In this case, the learning device 10-1 outputs predicted value AN "+1" indicating that the example data FE is the spam article, because the weighted sum CN "2" is more than "0".

Figure 4:
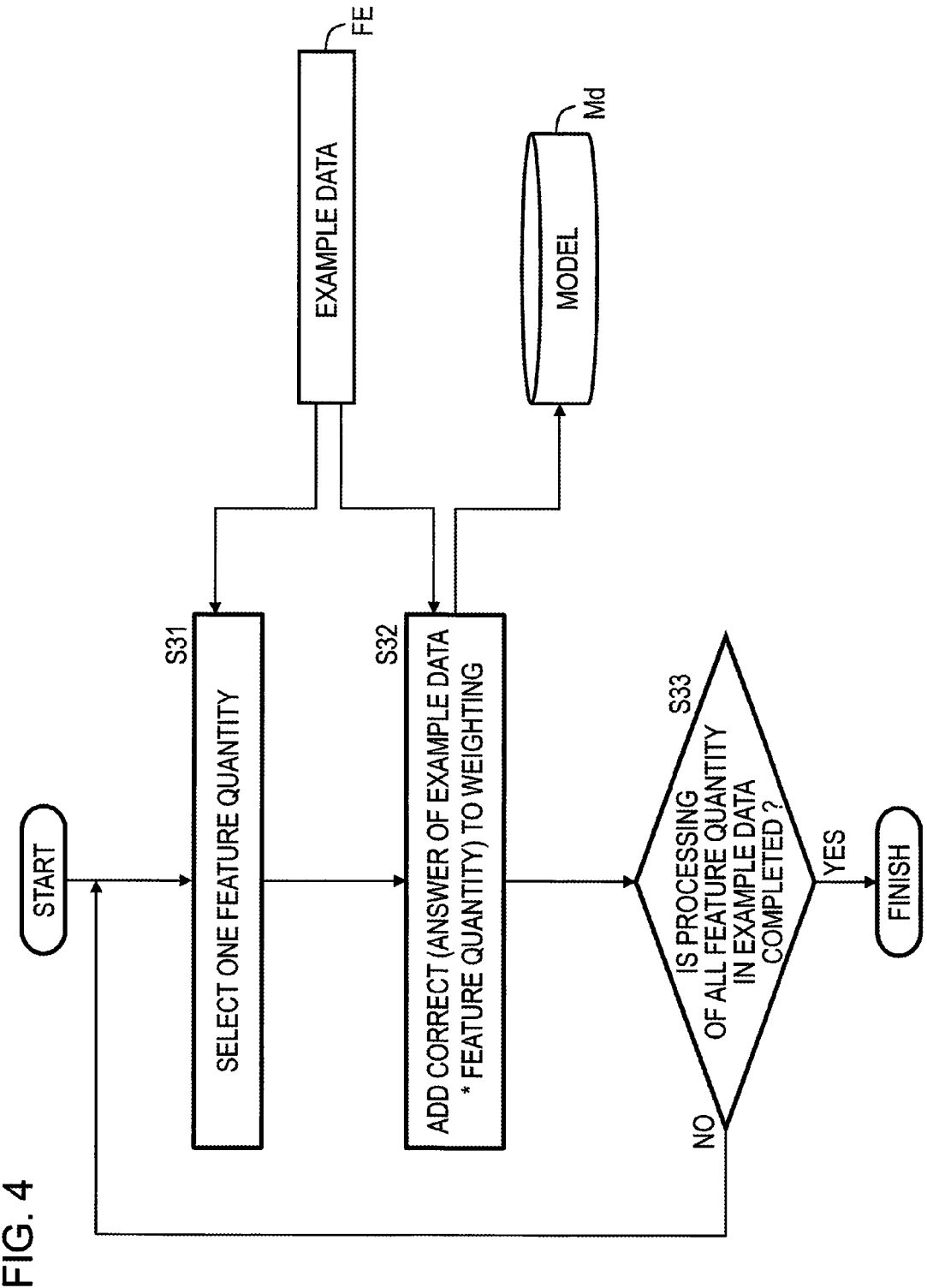
FIG. 4 is a diagram of flow chart explaining process of the step S15 in the flow chart of FIG. 2.

FIG. 4 is a diagram of flow chart explaining process of the step S15 in the flow chart of FIG. 2. The step S15 indicates to an update process of weighting of the feature quantity. The learning device 10-1 selects one feature quantity among the plurality of feature quantity included in the example data FE which is selected (S31). For example, the learning device 10-1, firstly selects the feature quantity "bargain", when the example data FE which is selected includes feature quantity "bargain", "water" and "free shipping".

Then, the learning device 10-1 updates the model Md by adding the value, which is multiplied the weighting of the feature quantity by the value (in this example +1/−1) indicating the classification item of the example data FE which is selected, to the weighting (S32). For example, it is exemplified that the classification item GR which prescribed beforehand in the example data FE which is selected is a non-spam article (a classification item: −1), and feature quantity "bargain" which is selected is value "+1". In this case, the learning device 10-1 adds the value "−1" (=−1 (classification item)*(+1) (weighting)) to the current weighting ("+1") of feature quantity "bargain". And the learning device 10-1 updates the current weighting to value "0" (=+1−1).

When the process in the step S32 is not completed about all feature quantities included in the example data FE which is selected (NO of S33), the learning device 10-1 executes the process in the step S32 for the different feature quantity included in the example data FE which is selected. On the other hand, when the process in the step S32 is completed about all feature quantities included in the example data FE which is selected (YES of S33), the learning device 10-1 finishes update process (S16 in FIG. 2) of the weighting based on the example data FE which is selected.

In this way, based on the training data Td where the classification item GR was identified beforehand, the model Md (feature quantity and the weighting) to classify the data for the classification target is generated. However, a user may not prepare the training data Td of enough quantity. In this case, the user may not make the ratio of classification item GR of training data Td match with the ratio of classification item GR of the true distribution. The true distribution means the distribution of the classification item of target data (for example, data Sd for the classification target depicted by FIG. 1) of which the classifier 10-2 classifies.

In this way, when the ratio of classification item GR of training data Td is different from the ratio of classification item GR of the true distribution, the data may not be classified with a high precision. The model Md has a tendency of the distribution of training data Td. Therefore, for example, when the ratio of the spam article of training data Td is bigger than the ratio of the spam article of data Sd for the classification target, the weighting Md, which is easy to be classified in the spam article more, is generated.

Therefore, the learning device 10-1 according to the embodiment uses the first ratio of the classification item GR in the data Sd for the classification target and the second ratio of classification item GR of the training data Td and a ratio of the example data FE including the feature quantity in each classification item GR of the training data Td. And the learning device 10-1 calculates the appearance probability that the example data FE including the feature quantity appears in the classification item GR in the data for the classification target based on this information.

In the embodiment, a user prepares the training data Td and inputs in the learning device 10-1. In addition, the user recognizes the distribution (the first ratio) of the classification item in the data for the classification target beforehand. Therefore, the user inputs the first ratio of classification item GR, of which the data Sd for the classification has, into the learning device 10-1. In other words, the user inputs the ratio of the spam article and the non-spam article, of which the data Sd for the classification target in the example of FIG. 1 has, into the learning device 10-1.

In addition, it is possible that the user calculates the second ratio of classification item GR of which the training data Td has based on the training data Td which is prepared. Therefore, the user calculates the ratio of the spam article and the non-spam article, in which the training data Td in the example of FIG. 1 has, from the training data Td and inputs it into the learning device 10-1. In addition, it is possible that the ratio of the example data FE including the feature quantity in each classification item GR of the training data Td is calculated based on the training data Td. Therefore, the user inputs a ratio of the example data FE, which include the feature quantity "bargain" in the spam article and the non-spam article in the training data Td in the example of FIG. 1, into the learning device 10-1.

In addition, the learning device 10-1 generates the model (rule) Md according to a value of the feature quantity of the training data Td based on the appearance probability of the feature quantity. And the classifier 10-2 classifies the plurality of data for the classification target based on the model Md which is generated.

(Appearance Probability)

Here, the appearance probability will be described. In an example of FIG. 1, the appearance probability of the classification item "spam article" of the feature quantity "bargain" indicates the appearance probability that the example data FE including the feature quantity "bargain" appears for a spam article of the true distribution. In addition, the appearance probability of the classification item "non-spam article" of the feature quantity "bargain" indicates the appearance probability that the example data FE including the feature quantity "bargain" appears for a non-spam article of the true distribution.

For example, a case, that the appearance probability of the classification item "spam article" of the feature quantity "bargain" is 30%, indicates that the example data FE, which includes the feature quantity "bargain" in which the training data Td has, was sampled with the probability of 30% from classification item "spam article" in the true distribution. In other words, it is indicated that the example data FE, which includes the feature quantity "bargain" that the training data Td has, has been sampled with 70% of probability accidentally from a classification item "non-spam article" of the true distribution. The calculation process of the appearance probability will be described later.

Therefore, the learning device 10-1 according to the embodiment uses a value of "bargain", in which the example data FE belonging to the classification item "spam article"

GR of the training data Td includes, with the probability of 30%, when the appearance probability of the classification item "spam article" of "bargain" is 30%. In other words, the learning device 10-1 does not use a value of feature quantity "bargain", in which the example data FE belonging to the classification item "spam article" GR of the training data Td includes, with the probability of 70%.

In this way, the learning device 10-1 according to the embodiment calculates the appearance probability of the feature quantity in the training data Td for the classification item of the true distribution. And the learning device 10-1 determines whether the feature quantity of training data Td is adopted according to the appearance probability stochastically. Thereby, it is possible that the learning device 10-1 according to the embodiment brings distribution of the feature quantity in the training data Td close to the true distribution. And the learning device 10-1 generates the model Md based on the feature quantity of the training data Td based on the appearance probability of each classification item GR of the feature quantity. Thereby, it is possible that the learning device 10-1 generates the model Md based on the training data Td having the true distribution and classifies data for the classification target in the classification item GR with a more highly precise.

Then, the constitution and block diagram of the data classification device according to the embodiment will be described. The data classification device according to the embodiment carries out processes corresponding to the operations of the learning device 10-1 and the classifier 10-2 depicted by FIG. 1.

(Constitution of the Data Classification Device)

Figure 5:
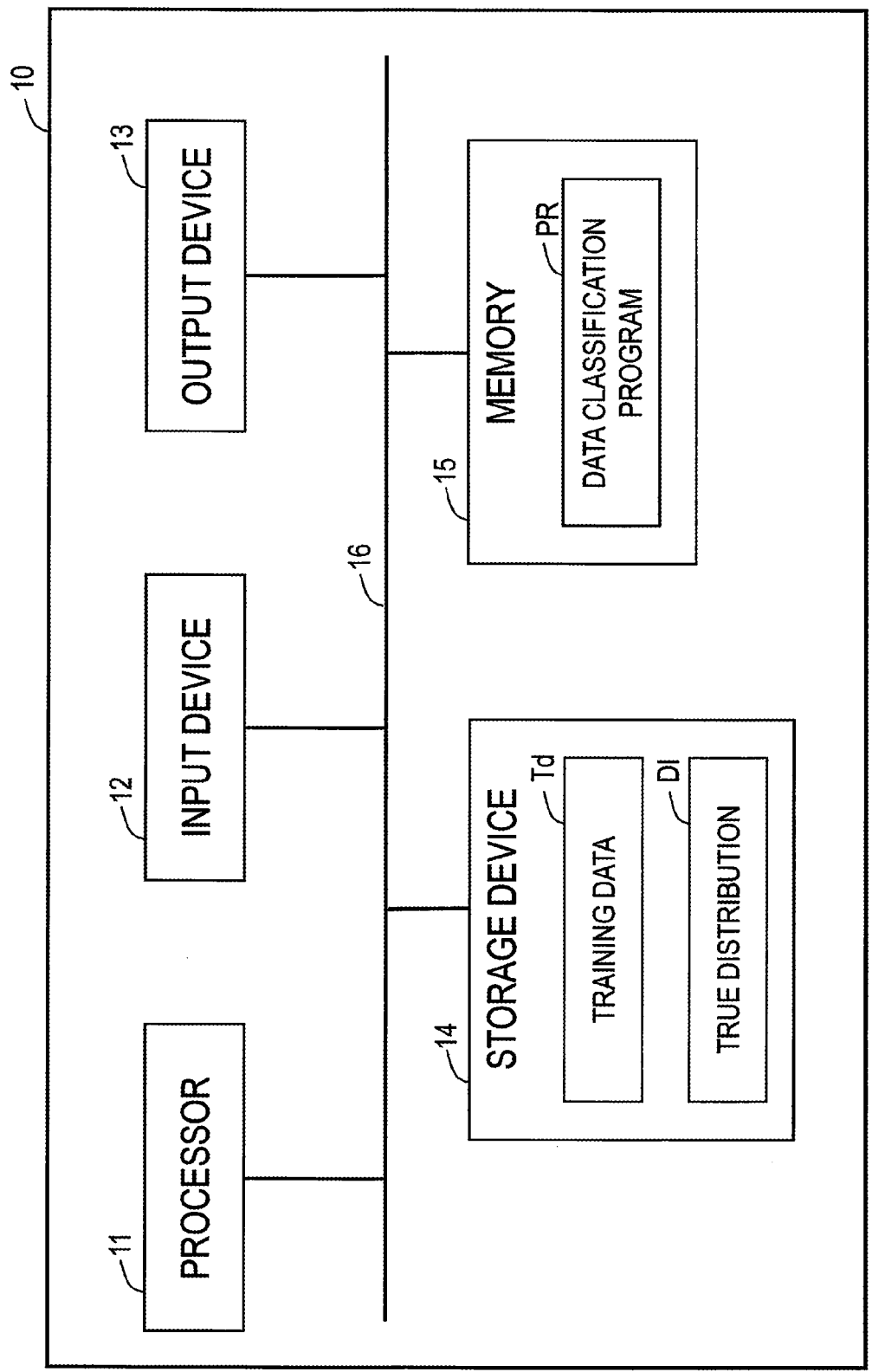
FIG. 5 is a diagram explaining a constitution of data classification device 10 according to the embodiment.

FIG. 5 is a diagram explaining a constitution of data classification device 10 according to the embodiment. The data classification device 10 in FIG. 5 has a processor 11, an input device 12, an output device 13, a storage device 14 such as a HDD (Hard Disk Drive), and a memory 15 such a RAM (Random Access Memory), for example. The all parts are connected through a bus 16 mutually. The input device 12 is, for example, a keyboard or a mouse, and, for example, the output device 13 is a display.

The storage device 14 stores the training data Td and information indicating the true distribution DI. A user prepares the training data Td. In addition, the true distribution DI is known. In addition, the memory 15 stores the data classification program PR according to the embodiment. The processor 11 is input the training data Td and the true distribution DI stored in the storage device 14 and executes the data classification processing according to the embodiment by collaborating with the data classification program PR.

(Block Diagram of the Data Classification Device)

Figure 6:
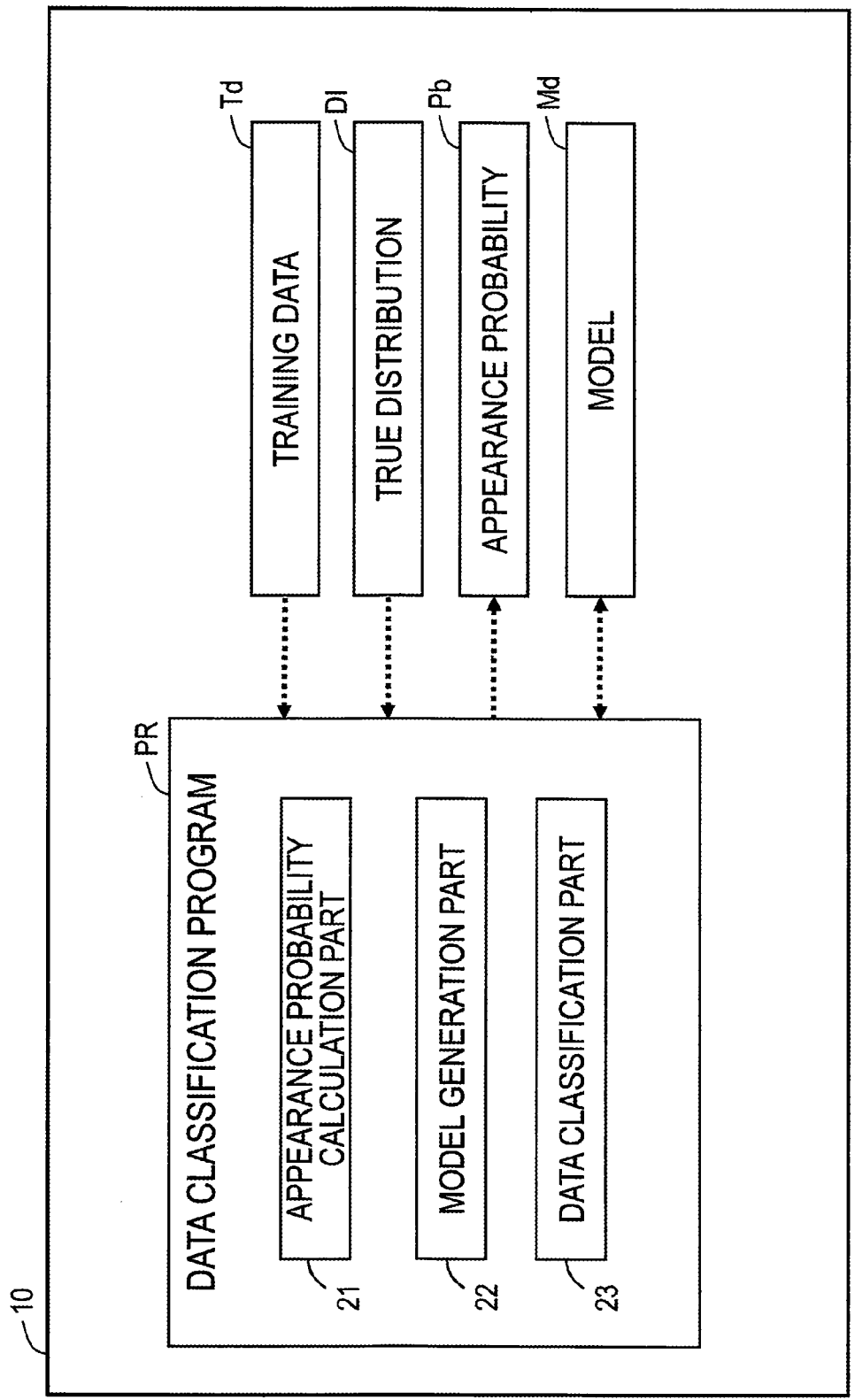
FIG. 6 is a software block diagram of the data classification device 10 according to the embodiment.

FIG. 6 is a software block diagram of the data classification device 10 according to the embodiment. The data classification program PR in the data classification device 10 has an appearance probability calculation part 21, a model generation part 22, and a data classification part 23. The model generation part 22 in FIG. 6 performs the process of corresponding to the learning device 10-1 depicted by FIG. 1, and the data classification part 23 performs processing corresponding to the classifier 10-2 depicted by FIG. 1.

The appearance probability calculation part 21 is input the ratio of classification item GR in which the true distribution DI stored in the storage device 14 (referring to FIG. 5) has. In addition, the appearance probability calculation part 21 is input the ratio of classification item GR in which the training data Td has and the ratio of the example data FE including the feature quantity in each of the classification item GR in the training data Td based on the training data Td stored in the storage device 14 (referring to FIG. 5).

And, the appearance probability calculation part 21 calculates the appearance probability Pb, in which the feature quantity included in the training data Td appears in each of classification items in the true distribution DI, for each of feature quantity, based on the information which are input. The model generation part 22 determines a value to adopt among values of the feature quantity included in the training data Td, based on the appearance probability Pb of each of the feature quantity calculated by the appearance probability calculation part 21. And the model generation part 22 generates the model Md based on a value of the feature quantity which is adopted in the training data Td.

The data classification part 23 classifies the data for the classification target in the classification item based on the model Md generated by the model generation part 22. The appearance probability Pb and the model Md may be stored in the storage device 14 or may be maintained on the memory 15 depicted by FIG. 5.

Then, the processes of the data classification device 10 according to the embodiment will be described based on a flow chart.

(Flow Chart)

Figure 7:
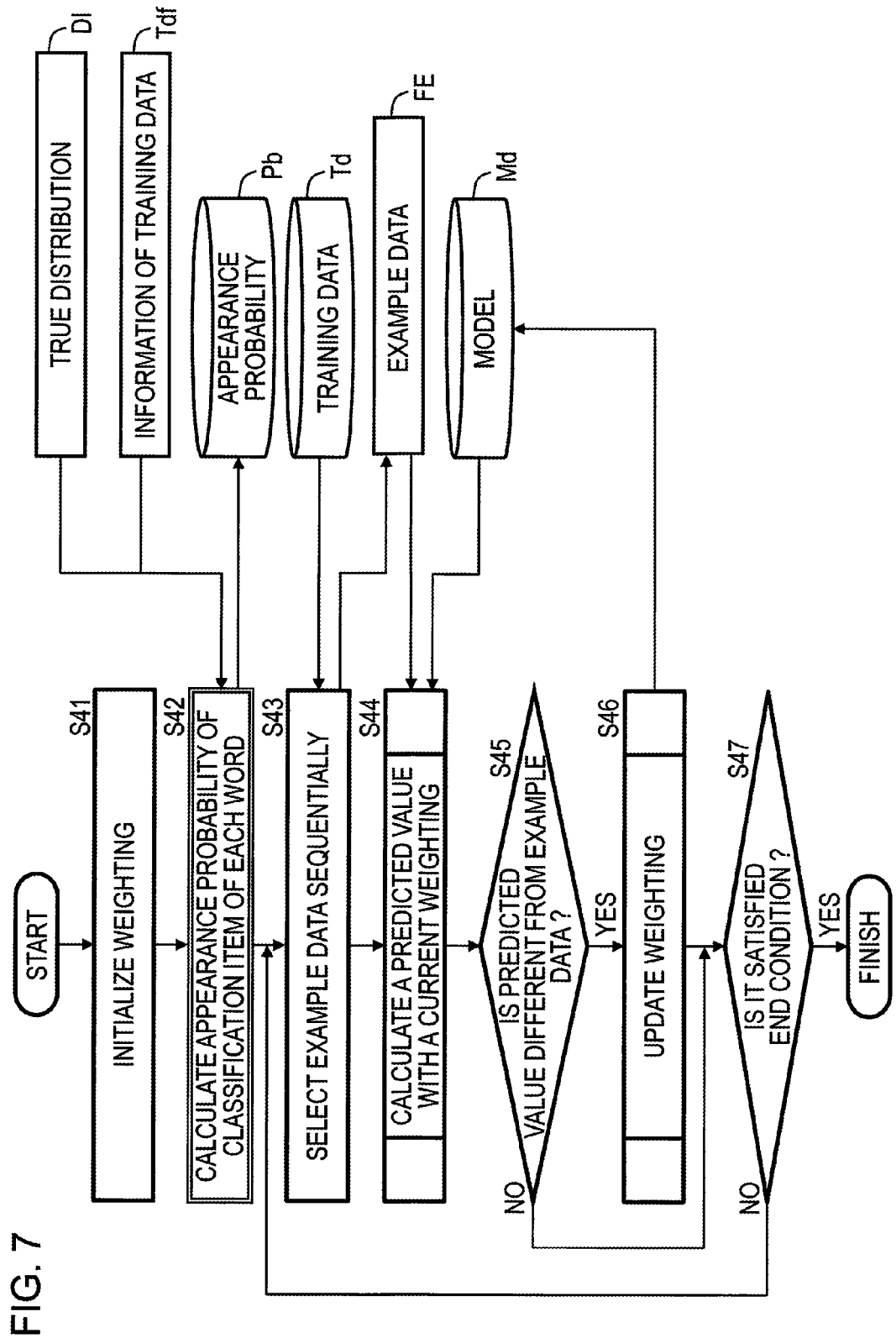
FIG. 7 is a diagram explaining a flow of the generation process of the model Md in the data classification device 10 according to the embodiment.

FIG. 7 is a diagram explaining a flow of the generation process of the model Md in the data classification device 10 according to the embodiment. In the flow chart of FIG. 7, the processing in the step S42 are different from the standard generation processing of the model Md which are illustrated by the flow chart of FIG. 2.

As same as the flow chart in FIG. 2, the appearance probability calculation part 21 in the data classification device 10 firstly initializes the weighting of each word indicating the feature quantity (S41). Here, the appearance probability calculation part 21 in the embodiment calculates the appearance probability Pb of each classification item GR in the true distribution DI about each feature quantity that the training data Td includes (S42). The appearance probability calculation part 21 memorizes the appearance probability Pb which is calculated in the storage device 14 (referring to FIG. 1), for example. As described above, the appearance probability Pb indicates the probability that the feature quantity in the training data Td was sampled based on enough certainty by each classification item in the true distribution. More information about the process in the step S42 will be described later based on a specific example.

Then, the model generation part 22 in the data classification device 10, as same as the flow chart depicted by FIG. 2, sequentially selects the example data FE in which the training data Td has (S43), and calculates the predicted value AN of the classification item GR based on the current weighting (S44). The details of the process in the step S44 are similar to the flow chart in FIG. 3. And the model generation part 22, as same as the flow chart depicted by FIG. 2, updates the weighting included in the example data FE which is selected (S46) when the predicted value AN of the classification item GR which is calculated is different from classification item GR set in the example data FE beforehand (YES of S45). The details of the process in the step S46 will be described later based on a flow chart in FIG. 8.

On the other hand, the model generation region 22 does not update the weighting of the feature quantity included in the example data FE when the predicted value AN of the classification item GR which is calculated matches with the classification item GR set in the example data FE beforehand (NO of S45). And the model generation part 22 selects next example data FE (S43) and repeats the processes in the steps S44-S46 when an end condition is not satisfied (NO of S47). When an end condition is satisfied (YES of S47), the model generation part 22 finishes processing.

As illustrated by an illustration of flow chart of FIG. 2, the end condition indicates, for example, a case that the precision of the correct answer, in which the predicted value AN of the classification item GR matches with the classification item GR set in the example data FE beforehand, gradually raises and the change of the precision converged. In other words, the model generation part 22 finishes the generation processing of the weighting based on the training data Td when the precision of the matching of the predicted value AN of classification item GR reaches the appointed standard. In this way, it is possible that the model generation part 22 generates the highly precise weighting.

Figure 8:
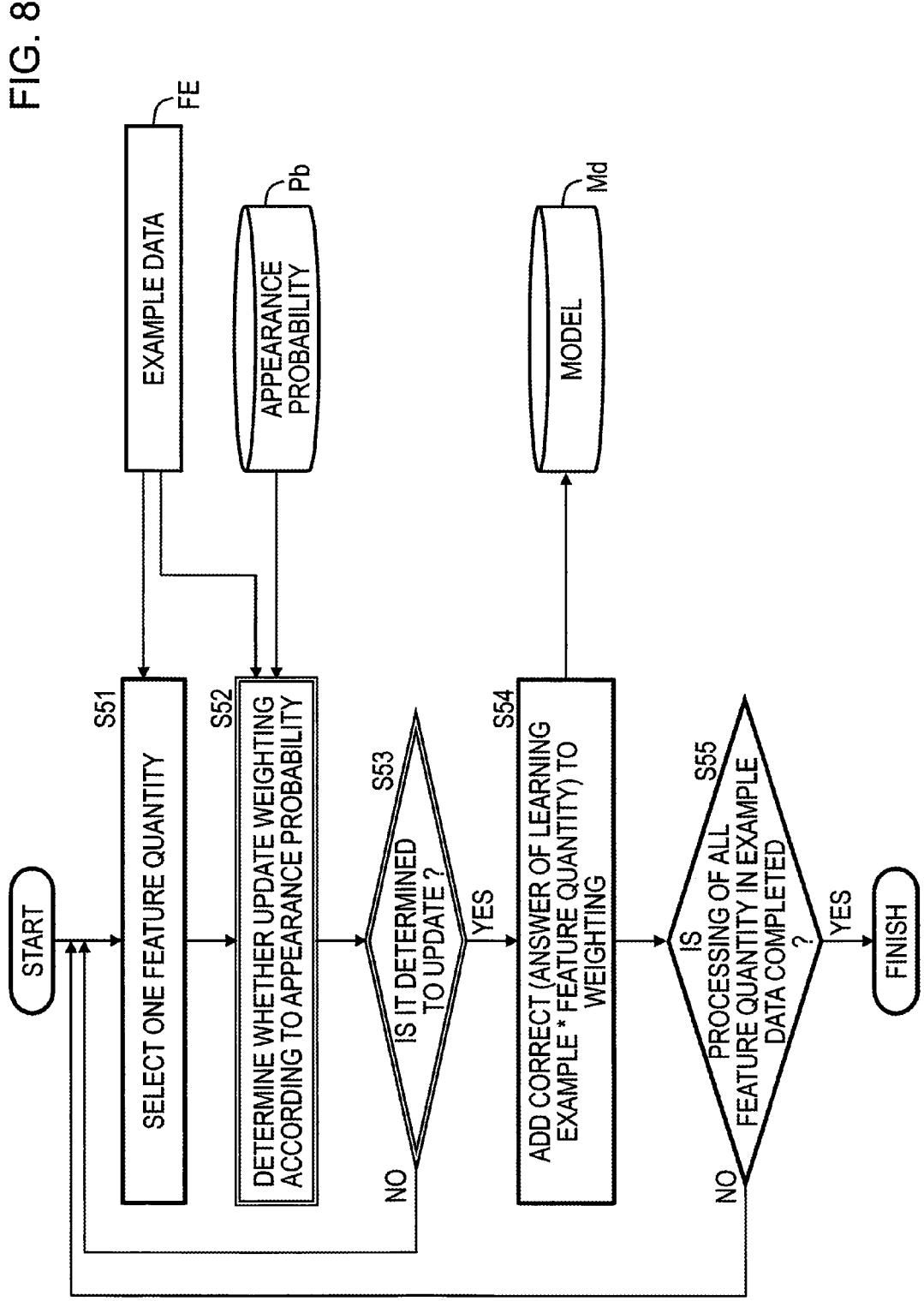
FIG. 8 is a diagram of flow chart explaining the update process of the weighting of the feature quantity according to the embodiment (the step S46 in FIG. 7).

FIG. 8 is a diagram of flow chart explaining the update process of the weighting of the feature quantity according to the embodiment (the step S46 in FIG. 7). In the flow chart in FIG. 8, the processes in the steps S52 and S53 are different from the standard update processing of the weighting of the feature quantity which is represented by the flow chart in FIG. 4.

The model generation part 22 selects one feature quantity among the feature quantity included in the example data FE which is selected (S51). Here, the model generation department 22 according to the embodiment determines whether or not the weighting of the feature quantity is updated according to the appearance probability Pb of the feature quantity which is selected (S52).

Especially, the model generation part 22 retrieves the appearance probability Pb of each classification item of the feature quantity which is selected from the storage device 14. And the model generation part 22 determines whether or not adopts a value of the feature quantity which is selected in the example data FE according to the appearance probability Pb of each classification item of the feature quantity which is selected. And, the model generation part 22 decides to update the weighting of the feature quantity concerned when a value of the feature quantity which is selected is adopted. In addition, the model generation part 22 decides not to update the weighting of the feature quantity concerned when a value of the feature quantity which is selected is not adopted.

More specially, the model generation part 22 adopts a value of the feature quantity which is selected, when certainty that the feature quantity which is selected appears in the classification item of the true distribution concerned is high, based on the appearance probability Pb of the classification item of the feature quantity, which is selected, set in the example data FE beforehand. In other words, the model generation part 22 does not adopt a value of the feature quantity which is selected, when certainty that the feature quantity which is selected appears in another classification item of the true distribution concerned is high, based on the appearance probability Pb of the classification item of the feature quantity, which is selected, set in the example data FE beforehand. The details of the process in the step S52 will be described later based on a specific example.

When the model generation part 22 does not update the weighting of the feature quantity which is selected (NO of S53), the model generation part 22 decides whether or not executes the update of the weighting according to the appearance probability Pb about another feature quantity included in the example data FE which is selected (S52). On the other hand, the model generation part 22 updates the weighting of the feature quantity which is selected (YES of S53), the model generation part 22 adds the value, which is multiplied a value of the feature quantity by the value (in this example +1/−1) indicating the classification item of the example data FE which is selected, to the weighting, as described in the flow chart of FIG. 4. The model generation part 22 in this way updates the model Md (S54).

When the processes S52 and S53 have not been executed about all feature quantities included in the example data FE which is selected (NO of S55), the model generation part 22 executes the processes S52-S54 for another feature quantity included in the example data FE which is selected. On the other hand, when the processes S52 and S53 are completed to execute about all feature quantities included in the example data FE which is selected (YES of S55), the model generation region 22 finishes the update process of the weighting based on the example data FE which is selected (S46 of FIG. 7). For example, the model generation part 22 stores the weighting for every feature quantity which is generated in the storage device 14 as the model Md.

In addition, in the update processing S46 of the weighting in the flow chart of FIG. 7, the model generation part 22 repeats the generation processing of the weighting based on the example data FE until the end condition is satisfied, for example. Therefore, the model generation part 22 may input same example data FE several times and may generate the model Md. Thereby, it is possible that the model generation part 22 generates the weighting based on the training data Td with more highly precise, when the example data FE is few.

According to the flow chart of FIG. 7, every time the model generation part 22 selects the example data FE, the model generation part 22 again determines whether a value of the feature quantity included in the example data FE is adopted according to the appearance probability Pb. In other words, the model generation part 22 generates the model based on a value of the feature quantity which is again adopted based on the appearance probability of the feature quantity every time.

Because a value of the feature quantity is adopted according to appearance probability Pb, even if it is the same example data, the result whether or not a value of the feature quantity is adopted is not same. Therefore, it is possible that the model generation part 22 raises the precision of the weighting by again adopting a value of the feature quantity included in the example data FE according to the appearance probability Pb and updating the weighting every time of an input when same example data FE is inputted several times.

However, the embodiment is not limited to the example of the flow chart of FIG. 7. That is, when same example data FE is inputted several times, the model generation part 22 may not adopt a value of the feature quantity included in the example data FE according to the appearance probability Pb again every time the data is input. For example, the model generation part 22 may repeatedly input a value of the feature quantity which is once adopted according to the appearance probability Pb and may update the weighting. In other words, the model generation part 22 may generate the model based on a value of the same feature quantity which is once adopted based on the appearance probability of the feature quantity.

The calculation process of the appearance probability Pb will be described based on a specific example successively. Firstly, for explaining the calculation process of the appearance probability Pb, the distribution of which the training data has and the true distribution DI according to the embodiment will be explained.

(True Distribution and Distribution of Training Data)

Figure 9:
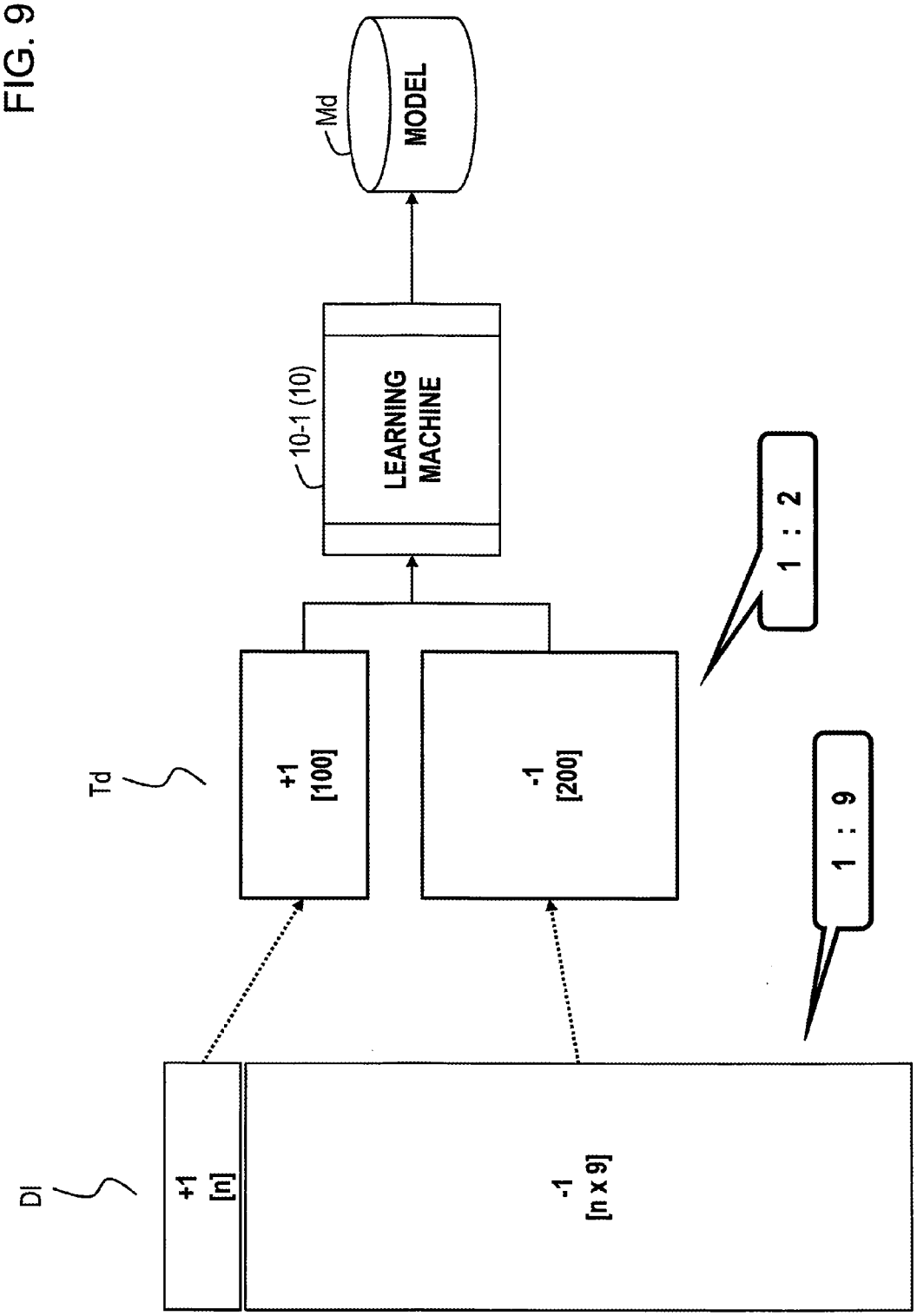
FIG. 9 is a diagram explaining difference between the true distribution DI of the classification item and the distribution of classification item of which the training data Td has according to the embodiment.

FIG. 9 is a diagram explaining difference between the true distribution DI of the classification item and the distribution of classification item of which the training data Td has according to the embodiment. As described above, the data classification device 10 is inputted the true distribution DI of the data for the classification target. According to the example of FIG. 9, the true distribution DI represents to "1 (spam article/+1):9 (non-spam article/−1)". This distribution indicates that the number of the non-spam article is "n*9" when the number of the spam article is "n".

In addition, because a user prepares the training data Td, it is input about the distribution of the classification item of the training data Td and the ratio of the training data including the feature quantity in each classification item of the training data Td. According to the example of FIG. 9, the number of example data FE belonging to each classification item of the training data Td is "100 (as for spam article/+1):200 (non-spam article/−1)". Therefore, the distribution of the training data Td is "1 (as for spam article/+1):2 (non-spam article/−1)".

The example will be described by "water" as the feature quantity. In the example of FIG. 9, the example data containing the feature quantity "water" are five cases among 100 example data of the classification item "spam article/+1" in the training data Td. In addition, about feature quantity "water," the example data containing feature quantity "water" are 20 cases among 200 example data of classification item "non-spam article/−1". Therefore, the ratio of the training data including the feature quantity in each classification item in the training data Td is that the spam article is "5/100" and the non-spam article is "20/200".

In addition, according to the example of FIG. 9, ratio (1/3) of the spam article in the training data Td is larger than the ratio (1/10) of the spam article in the true distribution DI. Therefore, when the model Md is generated based on the training data Td without considering the true distribution DI, the weighting of the feature quantity included in the example data FE of the spam article in the training data Td is calculated by a bigger value. In other words, because the ratio of the spam article in the training data Td is big for the ratio of the spam article in the true distribution DI, the model which is easy to be classified in a spam article more is generated.

In contrast, according to the embodiment, the weighting of the feature quantity is more highly precise generated because the model Md is generated based on the training data Td where the feature quantity is adopted to have the true distribution DI.

(Training Data)

Figure 10:
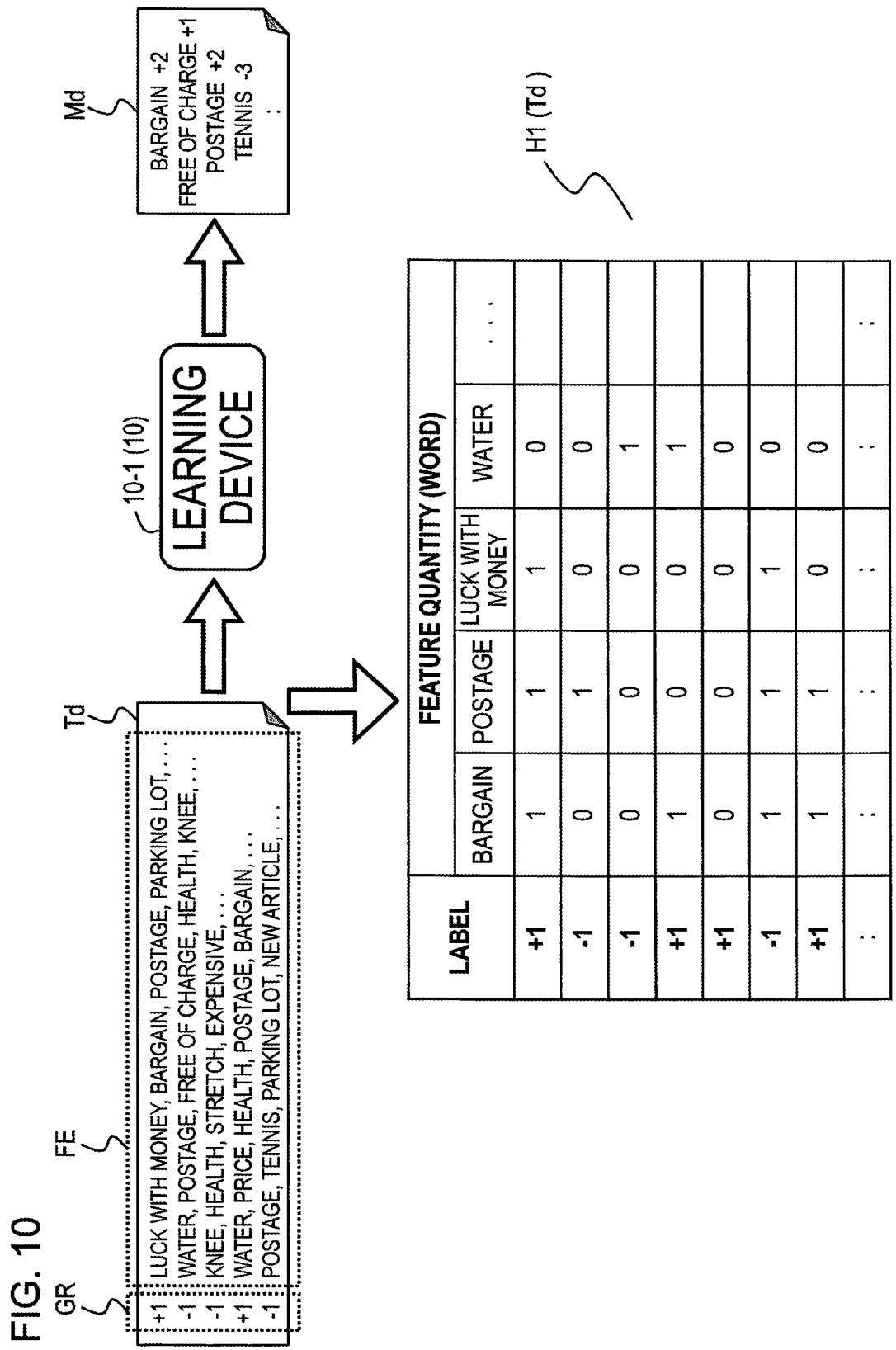
FIG. 10 is a diagram explaining the training data Td which is explained in FIG. 9 according to a table H1.

FIG. 10 is a diagram explaining the training data Td which is explained in FIG. 9 according to a table H1. The table H1 in FIG. 10 expresses some of the example data FE in the training data Td depicted by FIG. 9. In addition, as described above, the learning device (data classification device) 10-1 according to the embodiment adopts a value of the feature quantity included in the training data Td according to appearance probability Pb and generates the model Md.

Each line of the table H1 depicted by FIG. 10 represents one example data FE (in this example, a document). The label of table H1 represents the classification item GR of which the document belongs to, and the label "+1" represents the spam article, and the label "−1" represents the non-spam article. In addition, each cell in the table H1 has a value "1" when the document corresponding to the line includes the feature quantity corresponding to the column and a value "0" when the document corresponding to the line does not include the feature quantity corresponding to the column. In addition, the value "1" in the table H1 depicted by FIG. 10 represents a case which has a plurality of words in addition to a case which has one word.

Specially, the example data FE in the first line of training data Td of FIG. 10 is a spam article (+1) and has the feature quantity "bargain", "postage" and "luck with money" and does not have the feature quantity "water". In addition, the example data FE in the second line is a non-spam article (−1) and has the feature quantity "postage" and does not have the feature quantity "bargain", "luck with money" and "water". Similarly, the example data FE in the third line is a non-spam article (−1) and has the feature quantity "water" and does not have the feature quantity "bargain", "postage" and "luck with money". About example data FE of other lines, it is similar.

Then, the appearance probability will be described when the feature quantity is exemplified by the "water". The calculation processing of appearance probability of which the example data FE, which includes the feature quantity "water" in the training data Td represented by FIG. 9 and FIG. 10, appears in the example data FE of the spam article in the true distribution DI and the appearance probability of which the example data FE, which includes the feature quantity "water", appears in the example data FE of the non-spam article, will be described.

The model generation part 22 according to the embodiment calculates the appearance probability in which the feature quantity (for example, water) in the training data Td is included in a classification item "spam article", "non-spam article" in the true distribution DI, based on a Bayesian inference (or method). The Bayesian inference is a technique to be generally known, as follows.

$$P(A \mid w_i) = \frac{P(w_i \mid A)P(A)}{P(w_i)} \quad (1)$$

$$P(B \mid w_i) = \frac{P(w_i \mid B)P(B)}{P(w_i)} \quad (2)$$

$$P(w_i) = \frac{f_A(w_i) \cdot P(A) + f_B(w_i) \cdot P(B)}{N_A \cdot P(A) + N_B \cdot P(B)} \quad (3)$$

$$P(w_i \mid A) = \frac{f_A(w_i)}{N_A} \quad (4)$$

$$P(w_i \mid B) = \frac{f_B(w_i)}{N_B} \quad (5)$$

$$P(A) = \frac{R_A}{R_A + R_B} \quad (6)$$

$$P(B) = \frac{R_B}{R_A + R_B} \quad (7)$$

The formula 1 is a calculating formula for calculating the appearance probability in which the feature quantity "wi" (in the embodiment, a word) in the training data Td is included in the classification item A in the true distribution DI. In the formula 1, a value, which is multiplied ratio P (wi|A) (=the formula 4) of the example data FE of the classification item A including the feature quantity "wi" by a ratio P (A) (=the formula 6) of classification item A in the true distribution, is divided by a ratio P (wi) (=the formula 3) including the feature quantity "wi". Thereby, the appearance probability, which appears the feature quantity "wi" in the example data FE of the classification item A of the true distribution DI, is calculated.

At first, a variable to use in the formula 1 will be described. Firstly, the variable will be described from the formula 6 sequentially. In the formula 6, a ratio P (A) of the classification item A in the true distribution is calculated. Especially, the variable $R_A$ in the formula 6 is the ratio of classification item A in the true distribution DI, and the variable $R_B$ is the ratio of classification item B in the true distribution DI. Therefore, the variable P (A) which is calculated by the formula 6 indicates a ratio of the classification item A in the whole true distribution DI.

Then, the formula 4 will be described. In the formula 4, a ratio P (wi|A) of the example data FE, which includes the feature quantity "wi" in the classification item A of the training data Td, is calculated. A variable $N_A$ in the formula 4 is the number of example data FE of the classification item A in the training data Td. In addition, a variable $f_A$ (wi) in the formula 4 is the number of the example data FE including the feature quantity "wi" in the example data FE of classification item A in the training data Td.

Then, the formula 3 will be described. In the formula 3, a ratio P (wi), which is normalized a ratio of the example data including the feature quantity "wi" according to the true distribution, is calculated. A variable $N_A$ in the formula 3 is the number of example data FE of the classification item A in the training data Td, and a variable $N_B$ is the number of the example data FE of the classification item B in the training data Td.

In addition, a variable $f_A$ (wi) in the formula 3 is the number of example data FE including the feature quantity "wi" among the example data FE of the classification item A in the training data Td. Similarly, a variable $f_B$ (wi) is the number of example data FE including the feature quantity "wi" among the example data FE of the classification item B in the training data Td. In addition, a variable P (B) in the formula 3 is calculated based on the formula 7 and indicates a ratio of classification item B in the whole true distribution DI.

In other words, the variable P (wi) which is calculated by the formula 3 is the value which normalized a ratio of example data ($f_A$ (wi)/$N_A$, $f_B$ (wi)/$N_B$) including the feature quantity "wi" according to the true distribution. And, by the formula 1, the appearance probability P (A|wi), in which the feature quantity "wi" of training data Td is included in the classification item A of the true distribution DI, is calculated, based on the variable P (wi) calculated by the formula 3, the variable P (wi|A) calculated by the formula 4, and the variable P (A) calculated by the formula 6.

Then, the formula 2 is calculating formula which calculates the appearance probability that the feature quantity "wi" of training data Td is included in the classification item B of the true distribution DI. In the formula 2, the value, which multiplied the ratio P (wi|B) (=formula 5) of example data FE of classification item B including the feature quantity "wi" by the ratio P (B) (=formula 7) of classification item B of the true distribution, is divided by the ratio P (wi) (=formula 3) including the feature quantity "wi". The variable P (wi|B) in the formula 2 is calculated by the formula 5. In addition, the variable P (wi) in the formula 2 is calculated by the formula 3, and the variable P (B) is calculated by the formula 7. The variable P (wi) and the variable P (B) are described above.

The variable P (wi|B) calculated by the formula 5 indicates a ratio of example data FE including the feature quantity "wi" in the classification item B of training data Td. The variable $N_B$ in the formula 5 is the number of example data FE of classification item B in the training data Td. In addition, the variable $f_B$ (wi) in the formula 5 is the number of example data FE including the feature quantity "wi" among the example data FE of classification item B of the training data Td. In addition, as described above, the formula calculates the variable P (wi) which is normalized a ratio of example data ($f_A$ (wi)/$N_A$, $f_B$ (wi)/$N_B$) including the feature quantity "wi" according to the true distribution.

And, by the formula 2, the appearance probability P (B|wi), in which the feature quantity "wi" of the training data Td is included in the classification item B of the true distribution DI, is calculated based on the variable P (wi) calculated by the formula 3, the variable P (wi|B) calculated by the formula 5, and the variable P (B) calculated by the formula 7.

For example, the classification item A corresponds to the spam article and the classification item B corresponds to a non-spam article according to example of the true distribution DI and the training data Td depicted by FIG. 9 and FIG. 10. At first, calculation example of the appearance probability, in which the feature quantity "water" of training data Td is included in the non-spam article of the true distribution DI, will be described.

The ratio P (A) of the spam article in the whole true distribution DI which is calculated by the formula 6 is a value "0.1 (=1/10)". In addition, the ratio P (B) of the non-spam article in the whole true distribution DI which is calculated by the formula 7 is value "0.9 (=9/10)". In addition, a ratio $f_A$ (wi) of the example data FE including the feature quantity "water" among the example data FE belonging to the spam article of training data Td which is calculated by the formula 4 is value "0.05 (=5/100)". In addition, ratio $f_B$ (wi) of the example data FE including the feature quantity "water" among the example data FE belonging to the non-spam article of training data Td which is calculated by the formula 5 is value "0.1 (=20/200)".

Therefore, the ratio P (wi) of the number of the example data FE including the feature quantity "wi" in the whole training data Td and normalized based on the true distribution DI, which is calculated by the formula 3 is a value "0.09736842105264158 . . . (=(5*(1/10)+20*(9/10))/(100*(1/10)+200*(9/10)))". And by the formula 1, the appearance probability P (A|wi) in which the feature quantity "water" of training data Td is included in the spam article of the true distribution DI is calculated as a value "0.05135135135135136 (="0.05*0.1/0.09736842105264158 . . . ")".

Therefore, the appearance probability P(A|wi), in which the feature quantity "water" of the training data Td depicted by FIG. 9 and FIG. 10 is included in the spam article of the true distribution DI, is approximately 5% (≈0.05135 . . . ). When the appearance probability of the spam article of the feature quantity "water" is "5%", it is indicated that the example data FE including the feature quantity "water", in which the training data Td has, is sampled with the probability of 5% from the data of the spam article of the true distribution DI. That is, the example data FE including the feature quantity "water", in which the training data Td has, is accidentally sampled by 95% of probability from the data of the non-spam article of the true distribution DI.

Therefore, the model generation part 22 adopts a value of the feature quantity "water", in which the example data FE of the spam article in the training data Td has, with the probability of 5% as training data Td. In other words, the model generation part 22 does not adopt a value of the feature quantity "water", in which the example data FE of the spam article in training data Td has, with the probability of 95%.

Then, calculation example of the appearance probability of which the feature quantity "water" of training data Td is included in the non-spam article of the true distribution DI will be described. By the formula 2, the appearance probability P (B|wi) in which the feature quantity "water" of the training data Td is included in the non-spam article of the true distribution DI is calculated as a value "0.9243243243243244 (="0.1*0.9/ 0.09736842105264158 . . . ")".

Therefore, the appearance probability P(B|wi) in which the feature quantity "water" of the training data Td depicted by FIG. 9, FIG. 10 is included in the non-spam article of the true distribution DI is 92% (≈0.92432). When the appearance probability of the non-spam article of the feature quantity "water" is "92%", it is indicated that the example data FE including the feature quantity "water" in which the training data Td is sampled from the data of the non-spam article of the true distribution DI with the probability of 92%. That is, the example data FE including the feature quantity "water", in which the training data Td has, is accidentally sampled by 8% of probability from the data of the spam article of the true distribution DI.

Therefore, the model generation part 22 adopts a value of the feature quantity "water", in which the example data FE of the non-spam article in the training data Td has, with the probability of 92% as training data Td. In other words, the model generation part 22 does not adopt a value of the feature quantity "water", in which the example data FE of the non-spam article in training data Td has, with the probability of 8%.

(Adoption of Training Data)

Figure 11:
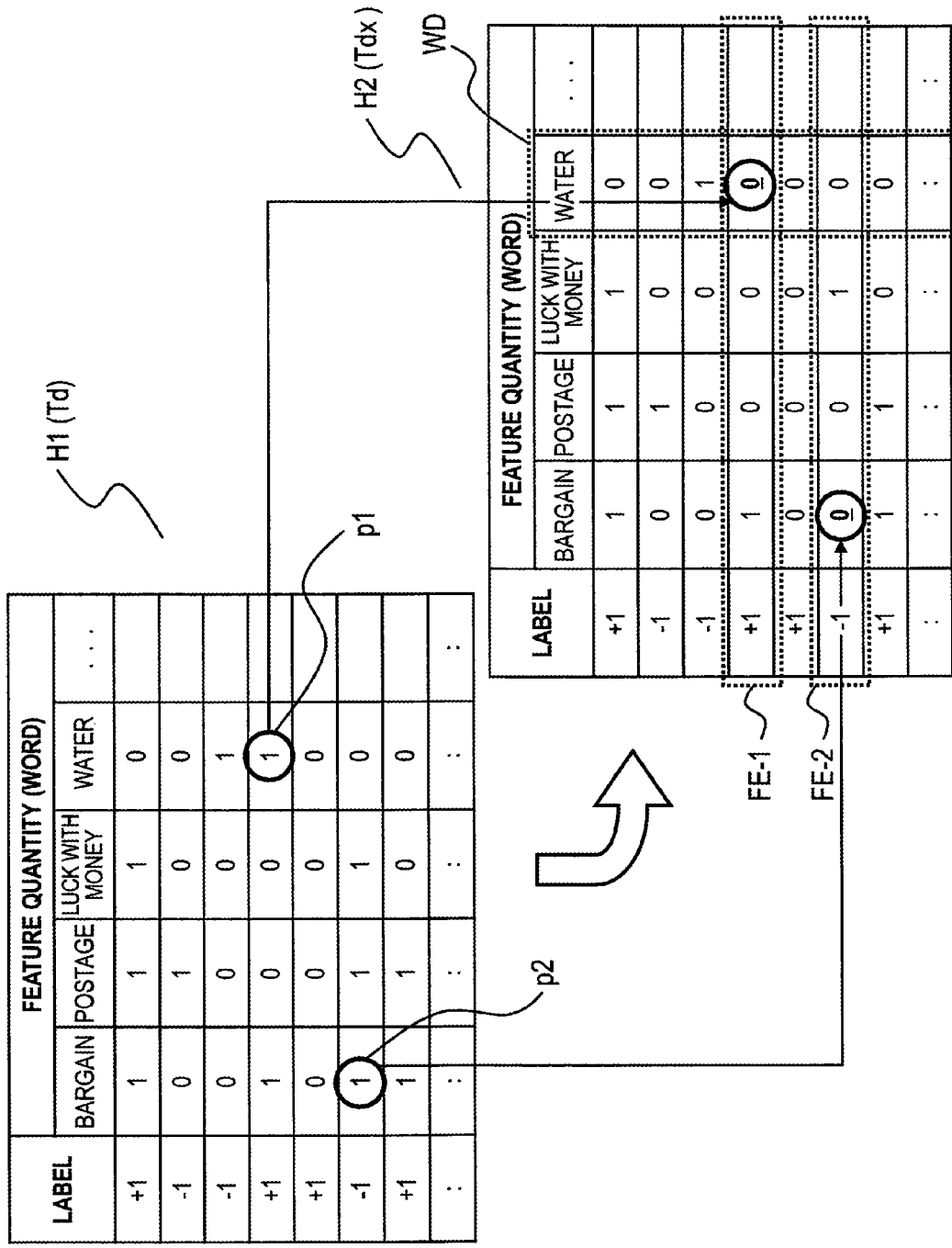
FIG. 11 is a diagram indicating an example of the adoption process of the training data Td.

FIG. 11 is a diagram indicating an example of the adoption process of the training data Td. The table H1 illustrated the training data Td in FIG. 11 is the same as the table H1 depicted by FIG. 10, and a second table H2 is a table representing training data Tdx including an adoption result of the feature quantity according to appearance probability Pb. As described above, about the feature quantity "water" of training data Td according to the embodiment, the appearance probability Pb which appears in the spam article of the true distribution DI is 5%, and the appearance probability Pb which appears in the non-spam article of the true distribution DI is 92%.

Specially, the model generation part 22 does not adopt the value "1" of the feature quantity "water" in the example data FE with 95% among the example data FE of the spam article including the feature quantity "water" of training data Td. The value "1" of the feature quantity "water" that is not adopted is considered to be value "0". Therefore, in the example data FE belonging to the spam article (a label: +1) in the training data Td represented by the table H1, the value "1" of the feature quantity "water" becomes to the value "0" with the probability of 95%, and the value of it becomes to the value "1" with the probability of 5%. For example, in the fourth line in the table H1 in FIG. 11, the value of the feature quantity "water" of example data FE of the spam article (a label: +1) indicates to "1" as depicted by a sign "p1", but is not adopted and becomes to the value "0" in the second table H2 because the value "1" corresponded to the appearance probability of 95%.

As described in FIG. 9, according to the embodiment, among the example data FE of 100 spam data, the example data including the feature quantity "water" is five. Therefore, among five example data FE, the value of the feature quantity "water" of only 5% in the example data FE is adopted. Therefore, the value of the feature quantity "water" in the example data FE of the spam article in the training data Td (=table H1) is hardly adopted.

In addition, the model generation part 22 does not adopt the value "1" of the feature quantity "water" in the example data FE with 8% among the example data FE of the non-spam article including the feature quantity "water" in the training data Td. The value "1" of the feature quantity "water" which is not adopted is considered to be the value "0". Therefore, in the example data FE belonging to the non-spam article (a label: −1) in the training data Td represented by the table H1, the value "1" of the feature quantity "water" becomes to the value "0" with the probability of 8%, and the value of it becomes to the value "1" with the probability of 92%.

As described in FIG. 9, according to the embodiment, among the example data FE of 200 non-spam data, the example data including the feature quantity "water" is twenty. Therefore, among twenty example data FE, the value of the feature quantity "water" of the example data FE is adopted with 92%. Therefore, the value of the feature quantity "water" in the example data FE of the non-spam article in the training data Td (=table H1) is almost adopted.

In addition, the model generation part 22 calculates each appearance probability in the spam article/non-spam article about the other feature quantity of "bargain", "postage" and "luck with money" and adopts value "1" of each feature quantity in the training data Td according to the appearance probability. Therefore, for example, in the sixth line in the table H1 in FIG. 11, the value of the feature quantity "bargain" of example data FE of the non-spam article (a label: −1) indicates to "1" as depicted by a sign "p2", but is not adopted and becomes to the value "0" in the second table H2 according to the appearance probability.

In this way, the model generation part 22 adopts a value of the feature quantity in the training data Td so as that the training data Td, which has different distribution of the ratio from the true distribution DI, has same ratio as the true distribution DI based on the appearance probability of each of the feature quantity, and generates the model Md. And the data classification part 23 classifies data targeted for the classification based on the model Md. Because the model generation part 22 generates the model Md having higher precision, it is possible that the data classification part 23 classifies data in the classification item based on the model Md of the high precision, with a more precise.

In addition, the data classification device 10 according to the embodiment deletes the feature quantity of example data FE in the training data Td partially and adopts it. In other words, the data classification device 10 according to the embodiment does not judge whether or not the adoption is applied for the example data FE unit in the training data Td, but judges whether or not the adoption is applied for a value unit of the feature quantity in the example data FE. For example, in the table H2 of FIG. 11, the data classification device 10 does not adopt the example data FE-1 on the fourth line, but not adopt the value p1 of the feature quantity "water" in example data FE-1 on the fourth line.

In this way, it is possible that the data classification device 10 according to the embodiment generates the model Md without decreasing the quantity of example data FE in the training data Td. Therefore, it is possible that the data classification device 10 generates the training data (model) Md in which the ratio matches with the true distribution DI without decreasing quantity of example data FE, even if example data FE of enough quantity is not prepared.

In addition, the data classification device 10 according to the embodiment does not judge whether or not the adoption is applied for the feature quantity unit in the training data Td, but judges whether or not the adoption is applied for a value unit of the feature quantity in the example data FE. For example, in the table H2 of FIG. 11, the data classification device 10 does not adopt the feature quantity "water" itself marked by "WD", but not adopt the value p1 of the feature quantity "water" in the example data FE.

In this way, it is possible that the data classification device 10 according to the embodiment generates the model Md without decreasing the quantity of in the training data Td. Therefore, it is possible that the data classification device 10 generates the training data (model) Md in which the ratio matches with the true distribution DI without decreasing the number of feature quantity, even if example data FE of enough quantity is not prepared.

Therefore, it is possible that the data classification device 10 uses the training data Td having the ratio of classification item GR where is the same as the true distribution DI without largely decreasing information of the training data Td. In other words, it is possible that the data classification device 10 generates the model Md having a high classification precision even if the training data Td of enough quantity is not prepared.

FIG. 12 is a diagram indicating another example of the training data Td by a table H3. In the examples in FIG. 10 and FIG. 11, the training data Td is exemplified to have the value "1" when having the feature quantity and the value "0" when not having the feature quantity, regardless of the number of feature quantity (word) in which each example data FE have. However, the training data Td may have the number of feature quantity (word), in which each example data FE has, for a value of the feature quantity.

Especially, the example data FE illustrated on the first line in a table H3 in FIG. 12 is the spam article and has the words "bargain" and "luck with money" one by one each and four words "postage", and does not have the word "water". In addition, the example data FE illustrated in the second line is the non-spam article and has three words "postage" and does not have the words "bargain", "luck with money" and "water". Similarly, the example data FE illustrated in the third line is the non-spam article and has three words "water" and does not have the words "bargain", "postage" and "luck with money". In addition, the example data FE illustrated in the fourth line is the spam article, and has words "bargain" and "water" two each and does not have the words "postage" and "luck with money". About example data FE of other lines, it is similar.

In FIG. 12, as similar to the examples of FIG. 10 and FIG. 11, and about the feature quantity "water" of training data Td according to the embodiment, the appearance probability Pb which appears in the spam article of the true distribution DI is 5%, and the appearance probability Pb which appears in the non-spam article of the true distribution DI is 92%. Also about the training data Tdy such as FIG. 12, the model generation part 22 does not adopt a value of the feature quantity "water" of example data FE of 95% among the example data FE of the spam article including the feature quantity "water" of training data Td, even if a value of the feature quantity "water" is whichever.

For example, in the spam article (a label: +1) on fourth line of the table H3 in FIG. 12, the value "2" of the feature quantity "water", which is marked by sign "p4", of example data FE becomes to the value "0" when the appearance probability corresponds to the probability of 95%. Similarly, for example, in the non-spam article (a label: −1) on third line of the table H3 in FIG. 12, the value "3" of the feature quantity "water", which is marked by sign "p3", of example data FE becomes to the value "0" when the appearance probability corresponds to the probability of 8%. About the other feature quantity, it is similar.

As described above, the classification method of the data according to the embodiment, has a calculation process that a processor calculates the appearance probability in which the training data including the feature quantity appear in the classification item of the distribution of data. By the calculation process, a first ratio of the plurality of classification items of the data for the classification and a second ratio of the plurality of classification items in the plurality of training data and the ratio of training data including the feature quantity in each of classification items in the plurality of training data are inputted. In addition, the classification method of the data according to the embodiment has a generation process that the processor generates a rule having weighting of the feature quantity and the feature quantity based on the plurality of training data having the feature quantity based on the appearance probability. In addition, the classification method of data has a classification process that the processor classifies the plurality of data for the classification target based on the rule which is generated.

Thereby, it is possible that the classification method of the data according to the embodiment generates the model Md based on distribution (true distribution) that the data for the classification have, without depending on the distribution of the classification item in which the training data Td has. Therefore, it is possible to classify the data for the classification with a more highly precise, according to the model Md based on the distribution in which the data for the classification has.

The example in which a user inputs the true distribution of which data for the classification has is described in the embodiment above, but the classifier 10-2 may obtain the distribution of which target data to classify has while learning. In addition, there is a case to make an object subset to classify collective user ID in true distribution in the social media analysis which collected the user IDs by language processing to match Japanese population statistics. In this case, when the true distribution is included in information to define the object subset, the true distribution included in the information may be used.

Further, in this subset, the attribute information of the user tends to be easy to be disclosed in young age and to be hard to be disclosed in old age. Therefore the users who the attribute information are estimated by the language analysis, increase, as the age increase. And, for example, when the data is classified by the generation, there may be a difference with the distribution of training data (the user where attribute information is disclosed) and the true distribution. The embodiment is effective when the true distribution is fixed and the training data (disclosure of the attribute information of the user) are changed.

In addition, there are technique with a provision of bias over a model and the technique by the ranking to adapt the distribution of training data to the true distribution. In a classification in the machine learning, when the ratio of the classification item in which the training data has is not the same percentage, the learning device generates the model that data are easy to be classified in the classification item of the majority. In the provision the bias over the model, the learning device provides the bias to generated model so that the classified ratio adapts to the true distribution (that is, adding the weighting of the feature quantity).

However, according to the technique with bias over the model, influence of the feature quantity to originally contribute to the classification item of the minority (in this example a spam article) have a big even the classification item of the majority (in this example a non-spam article). For example, the feature quantity of word "free shipping" will be described. It is estimated that the word "free shipping" is included in the spam article a lot, but it is a possibility to include in the non-spam article. Therefore, when adding the weighting of the word "free shipping", in order to adapt the ratio of training data to the ratio of true data, the addition will contribute to the classification to the non-spam article.

In addition, the word (for example, "today") included in both spam article and non-spam article with the same percentage is a neutral feature quantity. However, when adding the weighting of the word "today", in order to adapt the ratio of training data to the ratio of true data, the addition will contribute to the classification to the non-spam article.

In this way, according to the method to provide the bias in the classification item of the majority (that is, adjusting the weighting of the feature quantity), the precision of the classification does not raise. In addition, because the provision of the bias is obtained from experience, it is difficult to secure the most suitable result, and the cost in the procedure rises. In addition, because the model is optimized by a learning device so as to classify the training data with a highly precise, a guarantee to lead a highly precise classification result is lost when providing the bias optionally.

Then, the technique by the ranking will be described. In the ranking method, the classifier performs a ranking of the data for the classification of the fixed quantity in degree order to correspond to the classification item based on the model. And the classifier classifies the data based on the ranking result of the data of the fixed quantity to correspond with the true distribution. Thereby, it is possible to classify the data for the classification according to the true distribution, even if the ratio of training data does not accord with the ratio of the true data.

However, when the technique by the ranking is used, it is necessary to classify the data after accumulating the data of the fixed quantity, because it is difficult to classify the data for the classification consecutively. In addition, because it needs to perform a ranking of data of enough quantity to secure the reliability of the classification, it is not easy to measure data quantity beforehand.

In contrast, the classification method of the data according to the embodiment acquires the training data Td based on the distribution of which the data for the classification has. And, the classification method of the data according to the embodiment generates the model Md which is formed based on the training data Td which is acquired. Thereby, an adjustment of the bias for the model Md and the adjustment of the classification by the ranking method become needless.

In addition, it is possible to generate and add the training data Td without considering consistency with the true distribution DI according to the data classification method of the embodiment. For example, when the example data FE reported as the spam article are obtained in large quantities and all example data FE of the spam article are used as the training data Td, the distribution of example data FE of the spam article/non-spam article in the training data Td may not agree with the true distribution DI. When the ratio of the spam article is bigger than the ratio of the spam article in the true distribution, the weighting of the feature quantity which is easy to be classified in the spam article is generated.

In contrast, the data classification method according to the embodiment adopts a value of the feature quantity in which the training data Td has based on the appearance probability Pb corresponding to the true distribution, even if all the spam articles that are obtained are used as the training data Td. Therefore, it is possible to generate the model Md which classifies the data according to ratio of the classification item in which the true distribution DI has.

In addition, the generation process of the data classification method according to the embodiment judges whether or not values of the feature quantity in the plurality of training data are used based on the appearance probability of the feature quantity, and generates a rule having the weighting of feature quantity and the feature quantity, based on the value of the feature quantity which is judged to use. Thereby, it is possible that the data classification method according to the embodiment generates the model Md based on the training data Td which is applied the distribution of which the data for the classification has.

In addition, in the data classification method according to the embodiment, the generation process judges whether values of the feature quantity of the training data belonging to the first classification item in the plurality of training data based on the appearance probability of the first classification item of the feature quantity. In addition, the generation process judges whether values of the feature quantity of the training data belonging to the second classification item in the plurality of training data based on the appearance probability of the second classification item of the feature quantity.

Thereby, it is possible that the data classification method according to the embodiment adopts a value of the feature quantity included in training data belonging to each classification item so as to correspond with the true distribution, based on the appearance probability of each classification item of the feature quantity.

In addition, the generation process of the data classification method according to the embodiment is repeated, until the precision of the classification result to the classification item of the plurality of training data based on the formed rule (model) Md reaches the appointed standard. Thereby, it is possible to generate the model Md which classifies data with a more highly precise based on the plurality of training data.

In addition, the generation process of the data classification method according to the embodiment generates rule (model) Md based on a value of the feature quantity which is once obtained based on the appearance probability of the feature quantity, when the same plurality of training data are used repeatedly. Therefore, it is possible to generate the model Md which classifies the data with a more highly precision, because repeating model Md is generated based on a value of the same feature quantity which is adopted based on the plurality of training data.

In addition, the generation process of the data classification method according to the embodiment generates rule (model) Md based on a value of the feature quantity which is obtained based on the appearance probability of the feature quantity every time, when the same plurality of training data are used repeatedly. Therefore, it is possible to generate the model Md which classifies the data with a more highly precision, because repeating model Md is generated based on a value of the feature quantity which is different every time and adopted based on the plurality of training data.

Other Embodiments

In addition, in the embodiment above described, the data classification device 10 judges whether the feature quantity of the training data Td is adopted based on the appearance probability. However, the embodiment is limited to this example. For example, the data classification device 10 further may correct the feature quantity so that the feature quantity of the training data Td agrees with the feature quantity based on the appearance probability (for example, correct the value "0" to the value "1" in the example in FIG. 11). Or the data classification device 10 further may add or delete the example data FE which are adopted so that the feature quantity of the training data Td agrees with the feature quantity based on the appearance probability.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data classification method which classifies a plurality of data into a plurality of classification items based on a feature quantity included in the plurality of data, the method comprising:

calculating, by a processor, for each feature quantity, an appearance probabilities in which first training data including the feature quantity appears in the plurality of classification items based on a distribution of the feature quantity included in the plurality of data with respect to the plurality of classification items, the first training data being included in a first training data group and being classified into the plurality of classification items;

generating, by the processor, a rule having the feature quantity and a weighting of the feature quantity, based on a second training data group including a plurality of second training data of which the feature quantity is selected among the training data of each first training data included in the first training data group based on the appearance probabilities; and classifying, by the processor, the plurality of data according to the rule.

2. The data classification method according to claim 1, wherein the calculating comprises calculating the appearance probabilities, based on a first ratio of the plurality of the classification items in the plurality of data, a second ratio of the plurality of the classification items in the first training data group, and a ratio of the first training data including the feature quantity in each of the plurality of classification items in the first training data group.

3. The data classification method according to claim 1, wherein the generating comprises:

determining whether or not a value of the feature quantity in the first training data is used based on the appearance probabilities of the feature quantity; and generating the rule having the feature quantity and the weighting of the feature quantity based on the feature quantity which is determined to use.

4. The data classification method according to claim 3, wherein the determining comprises:

first determining whether or not the value of the feature quantity in the first training data belonging to a first classification item is used based on the appearance probability of the first classification item of the feature quantity; and second determining whether or not the value of the feature quantity in the first training data belonging to a second classification item is used based on the appearance probability of the second classification item of the feature quantity.

5. The data classification method according to claim 1, wherein the method further comprising repeating the generating until a precision of a classification result to the classification items of the plurality of the training data based on the rule which is generated reaches a predetermined standard.

6. The data classification method according to claim 5, wherein the generating comprising generating the rule based on the second training data group which is once selected based on the appearance probabilities, when repeating the generating.

7. The data classification method according to claim 5, wherein the generating comprising generating the rule based on the second training data group which is selected again based on the appearance probabilities, when repeating the generating.

8. A non-transitory computer readable storage medium storing therein a program for causing a computer to execute a process, the process comprising:

calculating, for each feature quantity, an appearance probabilities in which first training data including the feature quantity appears in a plurality of classification items based on a distribution of the feature quantity included in a plurality of data with respect to the plurality of classification items, the first training data being included in a first training data group and being classified into the plurality of classification items; and generating a rule which classifies the plurality of data into the plurality of classification items and has the feature quantity and a weighting of the feature quantity, based on a second training data group including a plurality of second training data of which the feature quantity is selected among the training data of each first training data included in the first training data group based on the appearance probabilities.

9. The non-transitory computer readable storage medium according to claim 8, wherein the calculating comprises calculating the appearance probabilities, based on a first ratio of the plurality of the classification items in the plurality of data, a second ratio of the plurality of the classification items in the first training data group, and a ratio of the first training data including the feature quantity in each of the plurality of classification items in the first training data group.

10. The non-transitory computer readable storage medium according to claim 8, wherein the generating comprises:

determining whether or not a value of the feature quantity in the first training data is used based on the appearance probabilities of the feature quantity; and generating the rule having the feature quantity and the weighting of the feature quantity based on the feature quantity which is determined to use.

11. The non-transitory computer readable storage medium according to claim 10, wherein the determining comprises:

first determining whether or not the value of the feature quantity in the first training data belonging to a first classification item in is used based on the appearance probability of the first classification item of the feature quantity; and second determining whether or not the value of the feature quantity in the first training data belonging to a second classification item in is used based on the appearance probability of the second classification item of the feature quantity.

12. The non-transitory computer readable storage medium according to claim 8, wherein the method further comprising repeating the generating until a precision of a classification result to the classification items of the plurality of the training data based on the rule which is generated reaches a predetermined standard.

13. A classification device comprising:
a memory which stores a plurality of data for classification; and
a processor configured to execute a process, the process including:
calculating, for each feature quantity, an appearance probabilities in which first training data including the feature quantity appears in a plurality of classification items based on a distribution of the feature quantity included in the plurality of data with respect to the plurality of classification items, the first training data being included in a first training data group and being classified into the plurality of classification items; and
generating a rule which classifies the plurality of data into the plurality of classification items and has the feature quantity and a weighting of the feature quantity, based on a second training data group including a plurality of second training data of which the feature quantity is selected among the training data of each first training data included in the first training data group based on the appearance probabilities.

14. The classification device according to claim 13, wherein the processor calculates the appearance probabilities, based on a first ratio of the plurality of the classification items in the plurality of data, a second ratio of the plurality of the classification items in the first training data group, and a ratio of the first training data including the feature quantity in each of the plurality of classification items in the first training data group in the memory.

15. The classification device according to claim 13, wherein the processor determines whether or not a value of the feature quantity in the first training data is used based on the appearance probabilities of the feature quantity, and generates the rule having the feature quantity and the weighting of the feature quantity based on the feature quantity which is determined to use.

16. The classification device according to claim 15, wherein the processor determines whether or not the value of the feature quantity in the first training data belonging to a first classification item is used based on the appearance probability of the first classification item of the feature quantity, and determines whether or not the value of the feature quantity in the first training data belonging to a second classification item is used based on the appearance probability of the second classification item of the feature quantity.

17. The classification device according to claim 13, wherein the processor repeats the generating until a precision of a classification result to the classification items of the plurality of the training data based on the rule which is generated reaches a predetermined standard.

* * * * *